United States Patent Office 3,647,756
Patented Mar. 7, 1972

3,647,756
PROCESS FOR THE PREPARATION OF GRAFT COPOLYMERS OF ACETALIZED POLYVINYL ALCOHOL WITH METHYL METHACRYLATE
Takuji Okaya and Hirotoshi Miyazaki, Kurashiki, Japan, assignors to Kurashiki Rayon Co., Ltd., Kurashiki, Okayama Prefecture, Japan
No Drawing. Filed Mar. 11, 1969, Ser. No. 806,307
Claims priority, application Japan, Mar. 14, 1968, 43/16,649
Int. Cl. C08f 29/30
U.S. Cl. 260—73 R    5 Claims

ABSTRACT OF THE DISCLOSURE

Process for preparation of graft copolymers by two-stage reaction in which at the first stage, a thermoplastic, natural or synthetic high molecular compound such as in the form of fibers, filaments and film is contacted with a vinyl monomer such as acrylic acid, its esters, alkyl methacrylate and acrylonitrile in the presence of at least 20 ppb. of molecular oxygen to the total amount of the reaction liquid; at the second stage, the resulting high molecular compound is contacted, in a system different from the first contact system, with at least one radical-polymerizable monomer such as acrylonitrile, vinyl chloride, styrene and vinyl acetate, in the optional presence of an inert diluent, in the absence of oxygen or in the presence of no more than 600 ppb. of molecular oxygen to the total amount of the reaction liquid at temperatures ranging from 40 to 120° C. Thus, graft-copolymers in which the radical-polymerizable monomer is grafted uniformly and in great quantity even to the interior of the high molecular compound can be obtained with a very easy operation.

---

This invention relates to a novel process for grafting a radical-polymerizable monomer or monomers to a high molecular compound. More particularly, the invention relates to a novel process for graft-copolymerizing a radical-polymerizable monomer or monomers to a thermoplastic natural or synthetic high molecular compound, by a two-stage treatment utilizing molecular oxygen.

Conventionally known methods for preparing graft copolymers include a chemical grafting process using catalysts, radiation grafting process utilizing ionizing radiation, and photografting process using ultraviolet rays, etc. Also various forms of the trunk high molecular compounds as the starting materials of graft copolymers are known, which can be classified into two large categories of homogeneous and heterogeneous systems. The invention concerns the latter category, i.e., in the invention the high molecular compounds are treated in heterogeneous systems. The grafting process of the invention, however, is novel, differing from any other known process.

Hereinafter the process of this invention will be explained.

According to the invention, a graft copolymer is produced by the process comprising contacting a thermoplastic, natural or synthetic high molecular compound with at least one vinyl monomer of the formula;

$$\begin{array}{cc} H & R \\ | & | \\ C=C \\ | & | \\ H & X \end{array}$$

wherein R is a member selected from the group consisting of hydrogen and methyl, and X is an atomic group selected from the group consisting of —CN, —CONH$_2$, —COOR' (R' being an alkyl of 1–3 carbons), phenyl, o-, m-, and p-toluyl, —CONH·CH$_2$OH, and $$-CH=CH_2$$

or with an inert diluent containing the said vinyl monomer, in the presence of at least 20 ppb. of molecular oxygen based on the amount of vinyl monomer or the total amount of the vinyl monomer and inert diluent, at temperatures ranging from room temperature to 150° C. (the first stage), and thereafter contacting the resulting high molecular compound with at least one radical-polymerizable monomer, in a system different from the contact system of the first stage, in the optional presence of an inert diluent, and also in the optional presence of not more than 600 ppb. of molecular oxygen based on the radical-polymerizable monomer or the total amount of the monomer and the diluent, at temperatures ranging from 40° to 120° C. (the second stage).

In the first stage treatment of this invention, a thermoplastic, natural or synthetic high molecular compound of various forms, such as powder, fibers such as staple fibers, continuous filaments, and tows, film, ribbon, woven good, knit good, non-woven fabric, and felt, is contacted with at least one vinyl monomer of the group represented by the formula

wherein the definitions of R and X are the same as those previously given,
in the presence of a predetermined amount of molecular oxygen. Specific examples of the vinyl monomer include methyl- and ethyl-methacrylates, methyl,- ethyl- and propyl-acrylates, acylamide, methacrylamide, N-methylol acrylamide, styrene, α-methylstyrene, vinyl toluene, acrylonitrile, methacrylonitrile, vinyl acetate, vinylidene chloride, butadiene, and isoprene. The vinyl monomer can be used alone, or may be diluted with an inert diluent. Generally the use of such monomer or monomers diluted with an inert diluent is preferred because of easier uninformalization of operation and reaction conditions. The latter practice is also advtangeous from an economical standpoint. The inert diluent must be non-reactive with the vinyl monomer and the high molecular compound, and furthermore preferably be capable of dissolving at least a portion of the vinyl monomer and swelling the high molecular compound, if only by a slight degree. The inert diluent may consist of one or more compounds, which is (are) suitably selected in accordance with the specific high molecular compound and the monomer or monomers employed. Thus the inert diluent useful for the first stage of this invention can be selected from wide varieties of compounds. Whereas, only a few specific diluents may be named herein by way of example: water, methanol, ethanol, acetone, formic acid, acetic acid, hexane, heptane, benzene, toluene, xylene, tetrachloroethane, etc.

When the vinyl monomer employed in the first stage itself has an affinity to the high molecular compound employed, and can swell the latter if slightly, the inert diluent is unnecessary. Otherwise the use of an inert diluent mixed with the vinyl monomer is required. Also when the vinyl monomer, if used alone, dissolves the high molecular compound, it is necessary to use the monomer mixed with an inert diluent which is a non-solvent for the high molecular compound.

In the present specification, the vinyl monomer or monomers, or the mixtures thereof with an inert diluent to be contacted with the high molecular compound, will be hereafter referred to as the monomeric system.

The contact of the high molecular compound with the monomeric system is effected in heterogeneous state in the first step of this invention. Thus, the high molecular compound maintained in solid state is contacted with a liquid or gaseous monomeric system. The contact is effected at temperatures ranging from room temperature to 150° C., preferably 40–90° C. The pressure may be reduced, but the operation is easier under atmospheric or an elevated pressure.

When the monomeric system is a mixture of a vinyl monomer and diluent, the concentration of the vinyl monomer is not critical, but the reaction progresses conveniently when it is at least 0.1% in a liquid monomeric system, and at least 5% in a gaseous monomeric system.

The important requirement in the first stage treatment of the invention is that the contact of the high molecular compound with the monomeric system is effected in the presence of molecular oxygen of not less than 20 ppb., preferably not less than 80 ppb., based on the total amount of monomeric system. According to the invention, it is essential that the molecular oxygen of at least the above specified amount should be present in the first stage reaction system. While there is no upper critical limit to the amount of molecular oxygen, normally the object of the invention is achievable under 9,000 ppb. or lower molecular oxygen concentration in the first stage reaction system.

The contact time of the high molecular compound with monomeric system in the presence of molecular oxygen may range from one to several tens of minutes, or even longer. Appropriate contact time in individual practice can be empirically determined, in accordance with the rate of graftcopolymerization and degree of grafting to be obtained in the second stage. However, normally the contact time is substantially inversely proportional to the temperature. If a higher temperature is employed in the first stage reaction system, a shorter contact time may be employed, and vice versa. More specific conditions are affected also by the types of high molecular compound and monomer employed; concentrations of the monomer and molecular oxygen in the first stage reaction system, and pressure, etc.

The object of the first stage reaction in this invention is not the graft-polymerization of the vinyl monomer to the high molecular compound, but the formation of a catalyst (presumably a high molecular peroxide (polymer peroxide) derived from vinyl monomer as later described) in the high molecular compound for promoting the second stage grafting reaction. Therefore, preferably the first stage reaction is controlled so that the weight increase of the high molecular compound due to the polymerization of vinyl monomer may be at most 3% to the initial weight. In many cases the above object of the first stage reaction is sufficiently accomplished by the weight increase of as little as 0.01–0.3%.

Then in the second stage of the subject process, the high molecular compound obtained in the first stage treatment is contacted with a radical-polymerizable monomer or monomers alone, or with a mixture of such monomer component and an inert diluent similar to that described in connection with the first stage, at temperatures ranging from 40°–120° C., preferably 50°–90° C. In the present specification, the radical-polymerizable monomer or a mixture thereof with an inert diluent, to be contacted with the high molecular compound in the second stage, will be thereafter referred to simply as the monomeric system, or the monomeric system of second stage.

In the second stage also the contact of the high molecular compound resulting from the first stage with the monomeric system is effected in heterogeneous system. That is, the high molecular compound maintained in solid state is contacted with liquid or gaseous monomeric system. The selection of monomeric system composition, i.e., whether the radical-polymerizable monomer alone is used or it is mixed with a diluent, can be made under the same considerations described as to the monomeric system composition in the first stage.

The important feature of the second stage is that the contact of the high molecular compound resulting from the first stage with the monomeric system of the second stage is effected in the presence of molecular oxygen of the amount not exceeding 600 ppb. preferably no more than 200 ppb., to the total amount of the monomeric system. That is, the allowable amount of molecular oxygen to be present in the monomeric system of second stage is extremely minor. In fact, the molecular oxygen may be absent.

Another significant requirement for the second stage treatment of this invention is that it is performed in an entirely different system from that of the first stage reaction. Therefore, even when the vinyl monomer employed in the first stage is radical-polymerizable, still the second stage reaction is effected in fresh monomer, if of identical type, but never in the monomer employed in the first stage. This rule also applies when an inert diluent is added to the monomer.

As the radical-polymerizable monomers useful in the second stage, for example, the following may be mentioned: monomers represented by a formula;

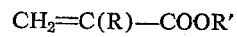

wherein R is hydrogen or a hydrocarbon residue of not more than three carbons, and R' is hydrogen or a hydrocarbon residue of not more than six carbons, in which —OH group being optionally substituted, vinyl chloride, vinylidene chloride, acrylonitrile, styrene, methacrylonitrile, acrylamide, vinyl acetate, butadiene, isoprene, vinylpyridine, vinylpyrrolidone, glycidyl methacrylate, and the like.

As already mentioned, the vinyl monomer employed in the first stage may be of the identical type with the radical-polymerizable monomer to be used in the second stage. In any case it is required in this invention that the first and second stage reactions are conducted in different systems. Therefore, after termination of the first stage, the monomeric system adhering to the high molecular compound should be removed as thoroughly as possible, by any optional means such as filtration, centrifuge, squeezing, washing, etc., before leading the high molecular compound into the second stage reaction system.

The second stage reaction can be performed under a reduced pressure similarly to the first stage, but atmospheric or an elevated pressure is preferred for ease of operation.

Through the foregoing procedures, graft-copolymerization of radical-polymerizable monomers to thermoplastic natural or synthetic high molecular compounds can be effected very smoothly and uniformly at high degree of grafting, while maintaining the monomer loss at a low level.

Our views on the mechanism of subject process is that, in the first stage the molecular oxygen reacts with the vinyl monomer in the high molecular compound to form a high molecular peroxide (polymer peroxide) of the vinyl monomer in situ, and in the second stage the high molecular peroxide acts as an initiator of radical-polymerization, to induce the graft polymerization of a radical-polymerizable monomer or monomers.

The formation of such high molecular peroxide in the first stage is rather persuasively demonstrated by the measurement conducted in later given Example 2, but the presence thereof is not necessarily the essence of this invention.

Among known chemical grafting processes, there is a method in which fibers are impregnated with a solution of conventional polymerization catalyst such as a low molecular peroxide, adjusted of the amount of the solution impregnated therewith to a predetermined value, and thereafter subjected to a graft-copolymerization. Although such a method somewhat resembles the process of this invention, the two are clearly different and the latter is the far superior method in that, wherein the high molecular peroxide of the vinyl monomer formed in the first stage acts as the graft-copolymerization catalyst in the second stage. The latter process also exhibits the following advantages.

(1) In the process, higher grafting efficiency is obtained.

That can be explained by the fact that when a low molecular catalyst impregnates a high molecular compound, the catalyst is diffused into the reaction liquid during the second stage reaction. Whereas, the high molecular catalyst of the invention hardly diffuses.

Furthermore, when such a high molecular catalyst is prepared in advance and a trunk high molecular compound is immersed in the catalyst, the catalyst hardly infiltrates into the trunk due to its high molecular weight, and consequently the second stage graft-copolymerization hardly occurs, as demonstrated in later given Controls 1 and 2.

(2) Optional amount of the catalyst can be formed with easy any effective control, in the trunk high molecular compound.

(3) Both the molecular oxygen and vinyl monomer or monomers employed in the first stage to form the catalyst are normally cheap. Accordingly the catalyst in the invention is economically very advantageous over conventional catalysts.

(4) The vinyl monomer and inert diluent can be freely selected in accordance with the intended combination of trunk high molecular compound as the starting material with the radical-polymerizable monomer to be grafted in the second stage.

Thus, even with a trunk polymer such as polyethylene terephthalate, of which film or fiber hardly allows diffusion of a conventional low molecular catalyst inside thereof, it is possible in accordance with the invention to effect diffusion of a vinyl monomer together with molecular oxygen into the shaped product, forming the high molecular catalyst at the inside of the trunk polymer. In that case, obviously a vinyl monomer or monomers which are freely diffusible in the shaped products of the particular polymer is selected. Thus, a radical-polymerizable monomer can be uniformly grafted to such a trunk high molecular compound, not only externally but also internally.

The high molecular compounds to which the present invention is applicable are thermoplastic, and may be either natural or synthetic. For example, cellusosic high molecular compounds such as cotton, rayon, cellulose acetate; diene-type high molecular compounds such as polyisoprene and polybutadiene; wool; silk; polyamino acid; polyamides such as 6-, and 6,6-nylon; aromatic polyesters such as polyethylene terephthalate; polyacrylonitrile and copolymers thereof; polyvinyl alcohol and derivatives thereof; polyethers such as polyethylene glycol; polyurethane; polyvinyl chloride; polyolefins such as polyethylene; polystyrene and derivatives thereof; polyacetals such as polyoxymethylene and derivatives thereof; polymethacrylates; polyvinyl acetate and derivatives thereof; and the like, may be named. In certian cases, considerable difference in rate of graft-copolymerization is observed depending on the type of high molecular compound, in connection with the radical-polymerizable monomer employed. Accordingly, occasionally it is recommendable to suitably select the type of vinyl monomer in the first stage and/or that of radical-polymerizable monomer in the second stage, or to effect graft polymerization of the second stage in the form of copolymerization using two or more monomers.

Incidentally, the term "graftcopolymers" is used in this specification in a broad sense, and signifies not necessarily the truly grafted substances only. Normally unreacted starting high molecular compound and homopolymer of the monomer to be grafted are present in the product of this process, as mixed with the graftcopolymer. Since separation of such components of the product is not required in most cases, the whole porduct is collectively referred to as the graftcopolymer.

The term "degree of grafting" in the specification is the percentile value calculated by a formula below:

$$\frac{\begin{pmatrix}\text{Weight of grafted}\\ \text{high molecular compound}\end{pmatrix} - \begin{pmatrix}\text{Weight of starting}\\ \text{high molecular compound}\end{pmatrix}}{\text{Weight of starting high moleular compound}} \times 100$$

and also the term "grafting efficiency" is the percentile value calculated by a formula below:

$$\frac{\begin{pmatrix}\text{Weight of grafted}\\ \text{high molecular compound}\end{pmatrix} - \begin{pmatrix}\text{Weight of starting}\\ \text{high molecular compound}\end{pmatrix}}{\text{Total weight of polymerized monomer}} \times 100$$

Furthermore, the unit 1 "ppb." to express the molecular oxygen concentration in the monomeric system means that 1 part by weight of molecular oxygen is contained in $10^9$ parts by weight of the monomeric system, that is, the total amount of either the vinyl monomer or monomers alone, or of the monomer component and inert diluent.

Hereinafter the invention will be explained in further details with reference to the working examples, it being understood that they are given in strictly illustrative sense but in no way restrictive of the scope of this invention.

In the examples, the measurement of molecular oxygen concentration in the monomeric system was conducted, when the monomeric system is in liquid state, by Winkler's method as to a sampled part of the monomeric system. The Winkler's method is fully described in Treadwell (translated by Hall), Analytical Chemistry, vol. 2, "Quantitative," 7th English ed., p. 654 (John Wiley & Sons, Inc., 1930). When the monomeric system is in gaseous state, the molecular oxygen concentration is determined by means of gas chromatography. Besides the foregoing methods, the oxygen concentration is measurable also by polarograph. Measured values do not greatly differ depending on the measuring method employed.

Unless otherwise specified, the parts and percentages in the examples are by weight.

EXAMPLE 1

Each 0.2 part of formalized polyvinyl alcohol fiber (degree of formalization: 23 mol percent, total draw ratio, 10 times) was immersed in each 270 parts of a 1.4% aqueous solution of methyl methacrylate (the monomeric system) containing molecular oxygen at various concentrations, at 80° C. for 20 minutes (the first stage reaction). Thereafter the fiber was removed of the liquid with a centrifugal machine, to a solution pick-up of 25%.

The fiber was then placed in 200 parts of 80° C. water from which oxygen had been thoroughly removed by introduction of nitrogen gas. After further introducing nitrogen gas sufficiently into the system, 3 parts of methyl methacrylate from which molecular oxygen had been removed was added, and the reaction vessel was closed airtightly. The system was thus heated at 80° C. for 90 minutes (the second stage reaction). The molecular oxygen concentration in the second stage reaction system was no more than 14 ppb.

The molecular oxygen concentration in the monomeric system of first stage and the degree of grafting of each run were as shown in Table 1.

Table 1

| Molecular oxygen concentration in first stage reaction liquid (ppb.): | Degree of grafting (percent) |
|---|---|
| —* | 11 |
| Less than 7 | 15 |
| 30 | 176 |
| 420 | 256 |
| 1340 | 257 |
| 2800 | 312 |

*In this run the first stage reaction was omitted.

From the above Table 1, it can be understood that the grafting rate is markedly accelerated in accordance with the present invention, compared with the cases when the molecular oxygen concentration in the monomeric system of first stage is very low, or when the first stage reaction is omitted.

EXAMPLE 2

Eleven (11) parts of the formalized polyvinyl alcohol fiber employed in Example 1 was added to a liquid mixture consisting of 2.8 parts of methyl methacrylate and 197.2 parts of water, in a stainless steel, cylindrical, and air-tightly closable reactor. The molecular oxygen concentration in the monomeric system was approximately 800 ppb. The first stage reaction was effected at 80° C. for 15 minutes. Thereafter the fiber was withdrawn, washed with water and air-dried at room temperature. The fiber showed hardly any weight increase.

Separately, nitrogen gas was blown into each 200 parts of 70° C. water to remove the molecular oxygen contained in the water to each different extent. To each of the aqueous system then 0.1 part of the above fiber was added, followed by the addition of 3 parts of methyl methacrylate from which molecular oxygen had been removed. The second stage reaction was effected by heating those systems at 70° C. for 60 minutes. The correlation of the molecular oxygen concentration in the monomeric system of second stage with the degree of grafting was as illustrated in Table 2.

Table 2

| Molecular oxygen concentration in second stage reaction liquid (ppb.): | Degree of grafting (percent) |
|---|---|
| Less than 7 | 273 |
| 72 | 230 |
| 140 | 192 |
| 245 | 128 |
| 354 | 86 |
| 436 | 42 |
| 653 | 0 |

The results in Table 2 clearly demonstrate that the degree of grafting also largely depends on the molecular oxygen concentration in the second stage reaction system, and that high degree of grafting are obtainable under the conditions specified in this invention.

Separately, 10 parts of the fiber completed of the first stage reaction was added to 200 parts of benzene, and left for 24 hours at 35° C. Thereafter the fiber was withdrawn, squeezed, and further immersed in fresh benzene several times, each immersion being followed by squeezing. The benzene employed was collected into a flask, and evaporated at room temperature under reduced pressure. The remaining very minor amount of residue was subjected to a peroxide determination by iodometry described in C. D. Wagner, R. H. Smith and E. D. Peters, Anal. Chem., 19 976–979 (1947) using a mixed solvent of acetic acid and isopropanol. The presence of $5 \times 10^{-6}$ mol of a peroxide per 1 g. of the fiber was confirmed. The molecular weight of the peroxide measured with a vapor pressure osmometer was approximately 1,500.

Furthermore, when the same treatment and determination were applied to the starting fiber, presence of no peroxide was detected.

EXAMPLE 3

0.1 g. of the formalized polyvinyl alcohol fiber used in Example 1 was placed in a liquid mixture consisting of 1.5 g. of methyl methacrylate and 100 g. of water (molecular oxygen concentration in the monomeric system was approximately 4,000 ppb.), and heated at 80° C. for 15 minutes (first stage reaction). Thereafter the fiber was withdrawn and squeezed, to a solution pick-up of 25%.

Then the fiber was added into 100 cc. of a 4 vol. percent aqueous solution of methyl acrylate. The molecular oxygen concentration in the monomeric system was less than 7 ppb. The second stage reaction was effected at 80° C., for various time lengths. The correlation between the reaction time and degree of grafting is shown in Table 3.

Table 3

| Second stage reaction time (hr.) | Degree of grafting (percent) |
|---|---|
| 0.25 | 34.1 |
| 0.5 | 51.7 |
| 1.0 | 108.3 |
| 1.0 [1] | 15.0 |
| 2.0 | 299.1 |

[1] In this run the first stage reaction was omitted.

It can be understood from Table 3 that the degree of grafting is variable by changing the second stage reaction time. When the first stage reaction is omitted, the resulting degree of grafting is low.

EXAMPLE 4

In a liquid mixture consisting of 2 cc. of ethyl acrylate, 7 cc. of methanol and 1 cc. of water charged in a test tube (molecular oxygen concentration in the monomeric system was approximately 4,000 ppb.), 0.5 g. of approximately 0.5-mm. thick polyvinyl alcohol film was immersed. The test tube was sealed in the air, and maintained at 65° C. for 20 minutes to effect the first stage reaction. Thereafter the film was withdrawn and dried, showing hardly any weight increase.

Then the film was immersed in a liquid mixture consisting of 3 cc. styrene and 70 cc. of methanol in a test tube. The molecular oxygen concentration in the monomeric system was then adjusted to 14 ppb. by blowing nitrogen gas into the system. The test tube was subsequently sealed and maintained at 65° C. for an hour. At the end of the second stage reaction, styrene-grafted polyvinyl alcohol film was obtained with a degree of grafting of 28%, and a grafting efficiency of 74%.

EXAMPLE 5

0.1 g. of staple fiber (1.5 deniers) made of polyethylene terephthalate was put in a liquid mixture consisting of 1 cc. of methyl methacrylate and 4 cc. of tetrachloroethane (the molecular oxygen concentration in the monomeric system was approximately 2,000 ppb.), and heated at 60° C. for 15 minutes (the first stage reaction). When the resulting fiber was dried at room temperature, a weight increase by 3% was confirmed.

Then the fiber was added into a liquid mixture of 5 cc. of styrene and 5 cc. of tetrachloroethane chaged in a test tube. The molecular oxygen concentration in the system was adjusted to 7 ppb. by displacing oxygen with nitrogen. Thereafter the system was heated at 80° C. for 40 minutes. Thus staple fiber of polyethylene terephthalate grafted with styrene was obtained with a degree of grafting of 62% and a grafting efficiency of 81%.

EXAMPLE 6

One (1) g. of rayon staple fiber (2.5 deniers) was put in a liquid mixture consisting of 2 g. of ethyl methacrylate, 50 cc. of methanol and 50 cc. of water charged in a stainless steel reactor. The molecular oxygen concentration in the monomeric system was approximately 800 ppb.

The system was maintained at 70° C. for 30 minutes, to effect the first stage reaction. Thereafter the fiber was withdrawn, washed with water and dried at room temperature. Hardly any weight increase in the fiber was observed.

Then the fiber was placed in a flask, and to which a liquid mixture consisting of 10 cc. of butyl acrylate and 190 cc. of methanol was added. The molecular oxygen in the liquid was driven out by nitrogen gas introduction, until the oxygen concentration in the system was reduced to less than 7 ppb. Then the system was heated at 50° C. for 6 hours to effect the second stage reaction. Thus obtained fiber was extracted with acetone for 24 hours, and butyl acrylate-grafted rayon was obtained with a degree of grafting of 180% and a grafting efficiency of 82%.

EXAMPLE 7

One (1) g. of Japanese pharmacopoeial absorbent cotton and 1 g. of paper pulp powder from softwood (40–80 meshes) were separately added to liquid mixtures, each consisting of 3 cc. of α-methylstyrene and 97 cc. of benzene. The molecular oxygen concentration in each monomeric system was approximately 1,000 ppb. The two systems were maintained at 55° C. for 30 minutes to effect the first stage reaction. The weight increase in the above cellulosic materials after the reaction was each no more than 1%.

The cellulosic materials were then added to each different monomeric system consisting of 8 cc. of acrylonitrile, 10 cc. of water and 82 cc. of methanol. The molecular oxygen concentration in each monomeric system was reduced to less than 7 ppb. by blowing nitrogen gas into the liquid. Both systems were maintained at 80° C. for 3 hours to effect the second stage reaction. Whereupon acrylonitrile-grafted absorbent cotton and pulp powder were obtained, with the respective degree of grafting of 38% and 7%. The degrees of grafting were calculated after immersing the cellulosic materials completed of the second stage reaction in dimethylformamide at room temperature for 8 hours.

EXAMPLE 8

0.1 g. of polyvinyl alcohol fiber with saponification degree of 99.9 mol percent was immersed in a liquid mixture consisting of 1.5 g. of methyl methacrylate and 100 g. of water (the molecular oxygen concentration in the monomeric system was approximately 4,000 ppb.), and heated at 80° C. for 15 minutes (first stage reaction). Thereafter the fiber was washed with water and added into a 2 vol. percent aqueous solution of ethyl acrylate. The molecular oxygen concentration in the liquid portion of this reaction system was adjusted to less than 7 ppb., and then the reaction system was heated at 80° C. for an hour, to effect the second stage reaction. Thus polyvinyl alcohol fiber grafted with ethyl acrylate was obtained at a degree of grafting of 203.5% and a grafting efficiency of 64%.

When the above two-stage reaction was repeated except that the first stage reaction was conducted in the absence of methyl methacrylate, the product showed a degree of grafting of 17%, and a grafting efficiency of 43%.

EXAMPLE 9

Example 8 was repeated except that the aqueous solution of ethyl acrylate was replaced by a 5 vol. percent aqueous solution of acrylonitrile. Thus obtained acrylonitrile-grafted polyvinyl alcohol fiber had a degree of grafting of 3.8%. Whereas, when the reaction time of second stage was extended to 3 hours, the degree of grafting rose to 11.2%. When the methyl methacrylate in the first stage reaction system was omitted, the degree of grafting of the product corresponding to each an hour and three hours of second stage reaction were, respectively, 1% and 1.7%.

EXAMPLE 10

Example 8 was repeated except that the aqueous solution of ethyl acrylate was replaced by a 2.5 vol. percent aqueous solution of methacrylonitrile. A methacrylonitrile-grafted polyvinyl alcohol fiber was obtained with a degree of grafting of 55.3% and a grafting efficiency of 73.2%.

On the other hand, when the use of methyl methacrylate in the first stage reaction was omitted, the degree of grafting of the product was 13.6%, and the grafting efficiency was 61.3%.

EXAMPLE 11

0.5 g. of an approximately 1-mm. thick formalized polyvinyl alcohol film (formalization degree: 53 mol percent) was put in an emulsion consisting of 3 g. of α-methylstyrene, 100 g. of water, and 0.1 g. of polyethylene glycol oleyl ether as the emulsifier. The molecular oxygen concentration in the liquid portion of the reaction system was 450 ppb. The first stage reaction was effected at 65° C. for 15 minutes, and thereafter the film was washed with water.

Then the film was immersed in a 1.5 vol. percent aqueous solution of methyl methacrylate, and heated at 65° C. for 60 minutes. This second stage reaction was performed under a molecular oxygen concentration of 21 ppb. in the monomeric system. Thus a methyl methacrylate-grafted polyvinyl alcohol film was obtained with a degree of grafting of 160.9%, and a grafting efficiency of 73%.

When the first stage reaction was omitted in the above procedures, the degree of grafting of the product was 27%, and the grafting efficiency was 55%.

EXAMPLE 12

One (1) g. of formalized polyvinyl alcohol fiber (formalization degree: 33 mol percent) was put in 100 cc. of a 1.5% aqueous solution of methyl methacrylate (molecular oxygen concentration in the monomeric system: approximately 2,000 ppb.), and heated at 60° C. for an hour (first stage reaction). Then the fiber was withdrawn, washed with water, and added to a liquid mixture composed of 2 cc. of ethyl acrylate and 100 cc. of water. The molecular oxygen concentration in the liquid portion of the reaction system was adjusted to less than 7 ppb., and the system was heated at 70° C. for 2 hours to effect the second stage reaction. Thus an ethyl acrylate-grafted fiber with a degree of grafting of 98% was obtained, at a grafting efficiency of 79%.

Control 1

Five hundred (500) cc. of methyl methacrylate was heated at 80° C. for 7 hours, while air was continuously blown thereinto. Thereafter the methyl methacrylate was removed by evaporation at room temperature under reduced pressure. Thus approximately 0.3 g. of a jelly-like residual substance was obtained as adhering to the inner walls of the reactor. This substance was subjected to the peroxide determination by iodometry described in Example 2, and also to an elementary analysis. Thus it was confirmed to be an almost alternating copolymer (methyl methacrylate:molecular oxygen=1.19:1.00 in mol ratio), i.e. a polymer peroxide. Its molecular weight was approximately 1,700, was determined by freezing point depression measurement of its benzene solution.

0.05 g. of the polymer peroxide was dissolved in 5 cc. of acetone, and the solution was added to 95 cc. of water to form a suspension. One gram of the starting fiber used in Example 12 was immersed in this suspension, and heated at 60° C. for an hour. The fiber subsequently withdrawn from the suspension and washed with water was subjected to the second stage reaction similar to that of Example 12. The resulting ethyl acrylate-grafted fiber showed a degree of grafting of only 7%, and a grafting efficiency of only 19%.

EXAMPLE 13

One (1) g. of the same starting fiber as employed in Example 12 was put in a liquid mixture composed of 20 cc. of methyl methacrylate and 80 cc. of methanol (molecular oxygen concentration in the monomeric system:

approximately 6,000 ppb.), and heated at 50° C. for 5 hours (first stage reaction). Then the fiber withdrawn from flask through the gas inlet. The reaction conditions and the results were as given in Table 4 below.

TABLE 4

| High molecular compound (form) | First stage reaction [a] | | | | Second stage reaction [a] | | | | Degree of grafting (percent) |
|---|---|---|---|---|---|---|---|---|---|
| | AAM (g.) | Diluent (cc.) | Temperature (°C.) | Time (hours) | Monomer (volume percent) | Diluent (volume percent) | Temperature (°C.) | Time (hours) | |
| Polyisoprene (sheet) | 2 | Methanol (100) | 90 | 20 | Butadiene (10) | Pentane (90) | 60 | 1 | 23 |
| Do | 0 | do | 90 | 20 | do | do | 60 | 1 | 0 |
| Polyoxymethylene (powder) | 5 | Methacresol (95) | 55 | 120 | Vinyl chloride (60) | Methanol (40) | 65 | 3 | 18 |
| Do | 0 | do | 55 | 120 | do | do | 65 | 3 | 0 |
| Polystyrene (chip) | 10 | {Benzene (10), Methanol (80)} | 70 | 60 | {Butadiene (90), Methyl methacrylate (10)} | | 70 | 0.5 | 44 |
| Do | 0 | {Benzene (10), Methanol (80)} | 70 | 60 | {Butadiene (90), Methyl methacrylate (10)} | | 70 | 0.5 | 21 |

[a] The molecular oxygen concentration in the monomeric system was 2,000–5,000 ppb.
[b] The molecular oxygen concentration in the monomeric system (total amount of the monomer and diluent) was no more than 30 ppb.

the liquid system was centrifuged, washed well with water, and added to a liquid mixture consisting of 50 cc. of system and 50 cc. of methanol. Under the molecular oxygen concentration of less than 7 ppb., the system was heated at 70° C. for 3 hours to effect the second stage reaction. Thus a styrene-grafted fiber with a degree of grafting of 67% was obtained at a grafting efficiency of 80%.

Control 2

0.05 g. of the polymer peroxide obtained in Control 1 was dissolved in 20 cc. of benzene, and so formed benzene solution was added to 80 cc. of methanol. To the liquid system then 1 g. of the starting fiber employed in Example 12 was added, and the system was maintained at 50° C. for 5 hours. The fiber was withdrawn from the system, washed well with water, and subjected to the second stage reaction similar to that of Example 13. The degree of grafting was only 0.7%, and the grafting efficiency was no higher than 4%.

EXAMPLE 14

Each 0.2 g. of the high molecular compounds listed in Table 4 was subjected to the first stage reaction with monomeric system composed of acrylamide (AAm) in combination with various diluents. After the reaction the high molecular compound was removed of the liquid, washed with methanol, placed on an evaporated dish, and put on the bottom of a 1-liter capacity separable flask which was provided with a gas inlet and outlet, and a thermometer. The flask was air-tightly closed and put in a thermostat at a predetermined temperature. During the second stage reaction, vapor of either butadiene-diluent mixture, butadiene-methyl methacrylate mixture, or of vinyl chloride-diluent mixture was introduced into the

EXAMPLE 15

Each 1 g. of various fibers were placed in each 100 cc. of the liquid monomeric systems of the first stage reaction identified in Table 5. After adjusting the molecular oxygen concentration of each system to 1,000–3,000 ppb., the first stage reaction was effected at 70° C. for 30 minutes. The fibers were withdrawn, removed from the liquid, washed with water, and added to each 500 cc. of liquid monomeric systems for the second stage reaction as identified in Table 5. The molecular oxygen concentration was reduced to less than 20 ppb. in each system, and the second stage reaction was effected at 80° C. for 40 minutes. The results are also given in Table 5.

TABLE 5

| Type of fiber | Monomeric system of first stage reaction | | Monomer system of second stage reaction | | Degree of grafting (percent) | Control [1] degree of grafting (percent) |
|---|---|---|---|---|---|---|
| | Monomer (percent) | Diluent (composition) | Monomer (percent) | Diluent (composition) | | |
| Polypropylene | MAN(2.5) | Hexane plus ethanol (1:1) | MMA(1.5) | Hexane plus ethanol (1:1) | 10.7 | 2.1 |
| Acetate | do | Water plus acetic acid (4:1) | do | Water | 45.8 | 10.0 |
| Polyacrylonitrile | do | Water plus dimethylformamide (9:1) | do | do | 51.0 | 9.0 |
| Do | do | do | MAN(2.5) | do | 48.1 | 7.8 |
| 6-nylon | do | Water plus formic acid (4:1) | Vinyl acetate (0.6) | do | 7.0 | 0 |
| 6,6-nylon | EA(2.0) | Water | MMA(1.5) | Water plus formic acid (4:1) | 17.1 | 1.6 |
| Rayon | do | do | do | Water | 5.0 | 0.3 |
| Polyacrylonitrile | do | Water plus acetonitrile (4:1) | do | do | 15.1 | 3.9 |
| Do | do | do | MAN(2.5) | do | 24.6 | 10.8 |
| 6-Nylon | do | Water | do | Water plus formic acid (4:1) | 16.5 | 0 |
| Polyvinyl alcohol | Styrene [2] (5) | do | MMA(1.5) | Water | 130.6 | 11.2 |
| 6-Nylon | do | do | do | do | 17.3 | 2.6 |
| Acetate | do | do | do | Methanol | 42.0 | 3.4 |
| Rayon | do | do | do | Water | 12.8 | 0.9 |
| Polyacrylonitrile | do | do | do | do | 19.5 | 5.3 |
| Polyvinyl alchol | do | do | Vinylidene chloride (5) | Methanol | 24.5 | 0.8 |
| 6,6-Nylon | do | do | MAN(2.5) | Water | 16.3 | 0 |
| Acetate | do | do | do | do | 35.9 | 0 |
| Polyvinyl chloride | α-methyl styrene [2] (5) | Water | MMA(20) | Hexane | 33.0 | 3.0 |
| Acetate | do | do | 2-vinylpyridine (10) | Water | 29.0 | 10.0 |
| Polyvinyl alcohol | do | do | MAN(2.5) | do | 51.7 | 8.8 |

[1] The first stage reaction was omitted, and the second stage reaction only was effected.
[2] As the emulsifier, 2.3 g./l. of sodium lauryl sulfate was used.

NOTE.—MMA=Methyl methacrylate, MAN=Methacrylonitrile, EA=Ethyl acrylate.

EXAMPLE 16

0.5 g. of the starting fiber employed in Example 1 was immersed in 25 cc. of a 2.5% aqueous solution of methacrylonitrile (molecular oxygen concentration in the monomeric system: approximately 3,000 ppb.), and heated at 50° C. for various periods of time, to effect the first stage reaction. The fiber was withdrawn, washed with water, and added to 250 cc. of a 1.5% aqueous solution of methyl methacrylate. Under the molecular oxygen concentration in the system of 20–50 ppb., the second stage reaction was effected at 90° C. for 30 minutes. The results were as given in Table 6.

Table 6

| First stage reaction time (min.): | Degree of grafting (percent) |
|---|---|
| —* | 24.1 |
| 15 | 76.1 |
| 30 | 135.4 |
| 60 | 207.2 |

*The first stage reaction was omitted, of the second stage reaction alone was practiced.

What is claimed is:

1. A process for the preparation of graft copolymers which consists essentially of contacting, in a first stage, acetalized polyvinyl alcohol with methyl methacrylate in an inert diluent, in the presence of at least 20 parts of molecular oxygen per $10^9$ total parts of mehyl methacrylate and the inert diluent, at a temperature ranging from room temperature to 150° C. and, after substantial removal of the methyl methacrylate and inert diluent picked up on the acetalized polyvinyl alcohol, thereafter contacting the so-treated polymer, in a system different from the first contact system, in a second stage with additional methyl methacrylate in an inert diluent, in the presence of up to 600 parts of molecular oxygen per $10^9$ total parts of the monomer and the inert diluent, at a temperature ranging from 40° C. to 120° C.

2. The process of claim 1, wherein the acetalized polyvinyl alcohol wetted with methyl methacrylate and an inert diluent, obtained after the reaction in the first contact system, is squeezed or washed, so as to substantially remove methyl methacrylate and the inert diluent picked up on the acetalized polyvinyl alcohol.

3. The process of claim 1, wherein the molecular oxygen concentration in the second stage is at the maximum 200 parts per $10^9$ total parts of methyl methacrylate and the inert diluent.

4. The process of claim 1, wherein the inert diluent is selected from the group consisting of water, methanol, and ethanol.

5. The process of claim 1, wherein the acetalized polyvinyl alcohol is in the fibrous form.

References Cited

UNITED STATES PATENTS

| | | | |
|---|---|---|---|
| 3,069,382 | 12/1962 | Nikolov et al. | 260—877 |
| 3,310,605 | 3/1967 | Marans et al. | 260—877 |
| 3,341,483 | 9/1967 | Zilkha et al. | 260—885 |
| 3,446,768 | 5/1969 | Ehmann | 260—885 |
| 3,461,052 | 8/1969 | Restaino et al. | 260—885 |
| 3,484,409 | 12/1969 | Ashikaga et al. | 260—73 |

WILLIAM H. SHORT, Primary Examiner

L. M. PHYNES, Assistant Examiner

U.S. Cl. X.R.

260—885, 875